United States Patent
Forte

(10) Patent No.: US 7,680,511 B2
(45) Date of Patent: Mar. 16, 2010

(54) METHOD AND APPARATUS FOR COMMUNICATING VIA VIRTUAL OFFICE TELEPHONE EXTENSIONS

(75) Inventor: Stephen P. Forte, West Hills, CA (US)

(73) Assignee: Ascendent Telecommunications Inc., Sherman Oaks, CA (US)

( * ) Notice: Subject to any disclaimer, the term of this patent is extended or adjusted under 35 U.S.C. 154(b) by 0 days.

(21) Appl. No.: 11/775,960

(22) Filed: Jul. 11, 2007

(65) Prior Publication Data

US 2007/0259688 A1 Nov. 8, 2007

Related U.S. Application Data

(63) Continuation of application No. 09/879,917, filed on Jun. 14, 2001.

(60) Provisional application No. 60/211,392, filed on Jun. 14, 2000.

(51) Int. Cl.
*H04M 1/00* (2006.01)
(52) U.S. Cl. .................. 455/555; 379/266.09; 379/242
(58) Field of Classification Search ................ 455/555, 455/445; 379/211, 266.09, 242
See application file for complete search history.

(56) References Cited

U.S. PATENT DOCUMENTS

| | | | |
|---|---|---|---|
| 4,481,382 A | 11/1984 | Villa-Real | |
| 4,661,970 A | 4/1987 | Akaiwa | |
| 4,661,974 A | 4/1987 | Bales et al. | |
| 4,674,115 A | 6/1987 | Kaleita et al. | |
| 4,829,560 A | 5/1989 | Evanyk et al. | |
| 4,879,740 A | 11/1989 | Nagashima et al. | |
| 4,922,517 A | 5/1990 | West, Jr. et al. | |
| 4,942,599 A | 7/1990 | Gordon et al. | |
| 4,955,050 A | 9/1990 | Yamauchi | |
| 4,964,154 A | 10/1990 | Shimotono | |
| 4,994,926 A | 2/1991 | Gordon et al. | |
| 5,003,595 A | 3/1991 | Collins et al. | |
| 5,054,051 A | 10/1991 | Hoff | |

(Continued)

FOREIGN PATENT DOCUMENTS

EP 9219085 10/1986

(Continued)

*Primary Examiner*—Nay A Maung
*Assistant Examiner*—Angelica M Perez
(74) *Attorney, Agent, or Firm*—Ogilvy Renault LLP

(57) ABSTRACT

A system for (and a method of) selectively establishing communication with at least one wireless device associated with a single telephone number serving as a virtual office extension is provided. In a preferred embodiment, the system includes a wireless connect unit in communication with an enterprise private branch exchange (PBX) network. The wireless connect unit preferably serves as a gateway between the PBX and one or more remote communication devices, including at least one wireless device, associated with a virtual extension telephone number. The remote wireless device can be used as a standard PBX office telephone for both inbound and outbound telephone calls. Thus, features of the PBX network (e.g., voice mail, direct extension dialing, corporate calling plan, etc.) are available to the remote wireless device even though it is not physically connected to the PBX. When the system receives an incoming call, it can route the call to a remote wireless device associated with a virtual extension, or to combination of devices simultaneously, or as desired by the user.

12 Claims, 6 Drawing Sheets

U.S. PATENT DOCUMENTS

| | | | |
|---|---|---|---|
| 5,109,400 A | 4/1992 | Patsiokas et al. | |
| 5,117,450 A | 5/1992 | Joglekar et al. | |
| 5,134,645 A | 7/1992 | Berken et al. | |
| 5,189,525 A | 2/1993 | Kotani | |
| 5,197,092 A | 3/1993 | Bamburak | |
| 5,218,628 A | 6/1993 | Ito | |
| 5,222,123 A | 6/1993 | Brown et al. | |
| 5,227,893 A | 7/1993 | Ett | |
| 5,243,645 A | 9/1993 | Bissell et al. | |
| 5,251,248 A | 10/1993 | Tokunaga et al. | |
| 5,291,302 A | 3/1994 | Gordon et al. | |
| 5,297,191 A | 3/1994 | Gerszberg | |
| 5,297,192 A | 3/1994 | Gerszberg | |
| 5,323,450 A | 6/1994 | Goldhagen et al. | |
| 5,353,331 A | 10/1994 | Emery et al. | |
| 5,418,837 A | 5/1995 | Johansson et al. | |
| 5,438,608 A | 8/1995 | Kojima | |
| 5,444,773 A | 8/1995 | Hirsohn et al. | |
| 5,448,378 A | 9/1995 | Matsumoto | |
| 5,452,347 A | 9/1995 | Iglehart et al. | |
| 5,454,032 A | 9/1995 | Pinard et al. | |
| 5,469,496 A | 11/1995 | Emery et al. | |
| 5,479,483 A | 12/1995 | Furuya et al. | |
| 5,481,382 A | 1/1996 | Takahashi et al. | |
| 5,481,605 A | 1/1996 | Sakurai et al. | |
| 5,487,099 A | 1/1996 | Maekawa | |
| 5,493,609 A | 2/1996 | Winseck, Jr. et al. | |
| 5,495,485 A | 2/1996 | Hughes-Hartogs | |
| 5,506,887 A | 4/1996 | Emery et al. | |
| 5,507,033 A | 4/1996 | Dolan | |
| 5,515,422 A | 5/1996 | MeLampy et al. | |
| 5,521,719 A | 5/1996 | Yamada | |
| 5,524,045 A | 6/1996 | Yazawa | |
| 5,524,146 A | 6/1996 | Morrisey et al. | |
| 5,526,403 A | 6/1996 | Tam | |
| 5,537,467 A | 7/1996 | Cheng et al. | |
| 5,537,610 A | 7/1996 | Mauger et al. | |
| 5,550,904 A | 8/1996 | Andruska et al. | |
| 5,568,489 A | 10/1996 | Yien et al. | |
| 5,579,375 A | 11/1996 | Ginter | |
| 5,594,777 A | 1/1997 | Makkonen et al. | |
| 5,606,604 A | 2/1997 | Rosenblatt et al. | |
| 5,608,786 A | 3/1997 | Gordon | |
| 5,621,539 A | 4/1997 | Brown et al. | |
| 5,631,745 A | 5/1997 | Wong et al. | |
| 5,661,785 A | 8/1997 | Carpenter et al. | |
| 5,673,118 A | 9/1997 | Kondo et al. | |
| 5,689,825 A | 11/1997 | Averbuch et al. | |
| 5,715,301 A | 2/1998 | Terasaki et al. | |
| 5,719,922 A | 2/1998 | Bremer et al. | |
| 5,722,076 A | 2/1998 | Sakabe et al. | |
| 5,724,656 A | 3/1998 | Vo et al. | |
| 5,732,074 A | 3/1998 | Spaur et al. | |
| 5,737,701 A | 4/1998 | Rosenthal et al. | |
| 5,742,905 A | 4/1998 | Pepe et al. | |
| 5,757,902 A | 5/1998 | Mitsuo | |
| 5,764,639 A | 6/1998 | Staples et al. | |
| 5,767,788 A | 6/1998 | Ness | |
| 5,768,350 A | 6/1998 | Venkatakrishman | |
| 5,790,640 A | 8/1998 | Tassa et al. | |
| 5,790,790 A | 8/1998 | Smith et al. | |
| 5,793,762 A | 8/1998 | Penners et al. | |
| 5,799,254 A | 8/1998 | Karmi et al. | |
| 5,802,160 A | 9/1998 | Kugell et al. | |
| 5,802,460 A | 9/1998 | Parvulescu et al. | |
| 5,805,298 A | 9/1998 | Ho et al. | |
| 5,815,562 A | 9/1998 | Iglehart et al. | |
| 5,822,416 A | 10/1998 | Goodacre et al. | |
| 5,825,759 A | 10/1998 | Liu | |
| 5,826,196 A | 10/1998 | Cuthrell | |
| 5,832,390 A | 11/1998 | Irvin | |
| 5,832,506 A | 11/1998 | Kuzma | |
| 5,839,067 A | 11/1998 | Jonsson | |
| 5,841,840 A | 11/1998 | Smith et al. | |
| 5,841,843 A | 11/1998 | Bristow et al. | |
| 5,844,979 A | 12/1998 | Raniere et al. | |
| 5,861,883 A | 1/1999 | Cuomo et al. | |
| 5,862,207 A | 1/1999 | Aoshima | |
| 5,870,549 A | 2/1999 | Bobo, II | |
| 5,870,677 A | 2/1999 | Takahashi et al. | |
| 5,884,185 A | 3/1999 | Kim | |
| 5,884,191 A | 3/1999 | Karpus et al. | |
| 5,889,845 A | 3/1999 | Staples et al. | |
| 5,890,064 A | 3/1999 | Widergen et al. | |
| 5,901,359 A | 5/1999 | Malmstrom | |
| 5,901,362 A | 5/1999 | Cheung et al. | |
| 5,907,598 A | 5/1999 | Mandalia et al. | |
| 5,909,650 A | 6/1999 | Jonsson | |
| 5,912,918 A | 6/1999 | Bauchot et al. | |
| 5,913,166 A | 6/1999 | Buttitta et al. | |
| 5,918,181 A | 6/1999 | Foster et al. | |
| 5,920,815 A | 7/1999 | Akhavan | |
| 5,920,863 A | 7/1999 | McKeehan et al. | |
| 5,926,760 A | 7/1999 | Khan et al. | |
| 5,940,752 A | 8/1999 | Henrick | |
| 5,943,414 A | 8/1999 | McIntee et al. | |
| 5,953,392 A | 9/1999 | Rhie et al. | |
| 5,953,676 A * | 9/1999 | Berry et al. | 455/564 |
| 5,956,331 A | 9/1999 | Rautiola et al. | |
| 5,956,652 A | 9/1999 | Eriksson | |
| 5,960,363 A | 9/1999 | Mizikovsky et al. | |
| 5,974,312 A | 10/1999 | Hayes, Jr. et al. | |
| 5,978,672 A | 11/1999 | Hartmaier et al. | |
| 5,983,098 A | 11/1999 | Gerszberg et al. | |
| 5,983,282 A | 11/1999 | Yucebay | |
| 5,987,499 A | 11/1999 | Morris et al. | |
| 5,991,637 A | 11/1999 | Mack, II et al. | |
| 5,995,843 A | 11/1999 | Sjodin et al. | |
| 6,009,088 A | 12/1999 | Taguchi et al. | |
| 6,011,975 A | 1/2000 | Emery et al. | |
| 6,014,377 A | 1/2000 | Gillespie | |
| 6,018,665 A | 1/2000 | Chavez, Jr. et al. | |
| 6,018,666 A | 1/2000 | Chavez, Jr. | |
| 6,021,138 A | 2/2000 | Lee | |
| 6,021,335 A | 2/2000 | Zicker et al. | |
| 6,023,241 A | 2/2000 | Clapper | |
| 6,028,764 A | 2/2000 | Richardson et al. | |
| 6,035,193 A | 3/2000 | Buhrmann et al. | |
| 6,035,204 A | 3/2000 | Lee | |
| 6,041,045 A | 3/2000 | Alterman et al. | |
| 6,047,198 A | 4/2000 | Sudo | |
| 6,052,573 A | 4/2000 | Ohmori et al. | |
| 6,052,581 A | 4/2000 | O'Connell et al. | |
| 6,069,588 A | 5/2000 | O'Neill, Jr. | |
| 6,073,029 A * | 6/2000 | Smith et al. | 455/555 |
| 6,073,033 A | 6/2000 | Campo | |
| 6,115,616 A | 9/2000 | Halperin et al. | |
| 6,122,502 A | 9/2000 | Grundvig et al. | |
| 6,125,287 A | 9/2000 | Cushman et al. | |
| 6,275,577 B1 * | 8/2001 | Jackson | 379/211.01 |
| 6,711,401 B1 * | 3/2004 | Chow et al. | 455/414.1 |
| 6,771,761 B1 | 8/2004 | LaPierre | |
| 2001/0003706 A1 * | 6/2001 | Warburton et al. | 455/463 |
| 2002/0013141 A1 | 1/2002 | Cox et al. | |
| 2002/0019246 A1 * | 2/2002 | Forte | 455/555 |
| 2002/0122545 A1 | 9/2002 | Schwab et al. | |
| 2006/0245569 A1 * | 11/2006 | Forte | 379/211.01 |

FOREIGN PATENT DOCUMENTS

| | | |
|---|---|---|
| EP | 0 836 315 A2 | 4/1998 |
| WO | WO 97/10668 | 3/1997 |

* cited by examiner

US 7,680,511 B2

METHOD AND APPARATUS FOR COMMUNICATING VIA VIRTUAL OFFICE TELEPHONE EXTENSIONS

This application is a continuation of application Ser. No. 09/879,917, filed Jun. 14, 2001, which claims the benefit of U.S. provisional patent application No. 60/211,392, filed Jun. 14, 2000, which are hereby incorporated by reference in their entireties.

BACKGROUND

The office telephone is the primary point of contact of most business people. Typically, corporations invest significantly in their office telephone infrastructure, including the considerable costs of constructing and maintaining a traditional hardwired telephone infrastructure at each enterprise location. In addition, corporations typically invest in a private branch exchange (PBX) network and its associated services, including voice mail, paging and unified messaging systems. Further, most corporations have negotiated contracts with their telephone carriers (e.g., local and long distance carriers) to ensure they obtain the lowest possible rates for calls placed via their corporate network. However, because the corporate workforce is becoming increasingly mobile, more business people are using wireless telephones to conduct their business when they are out of the office. This has resulted in corporations spending a larger portion of their telecommunications budget on wireless communications, with far less favorable negotiated rates than the rates of their corporate network. In addition, wireless communication systems often lack the enhanced conveniences (e.g., interoffice voice mail, direct extension dialing, etc.) that corporate users have come to expect in the office environment and for which most of the costs may have already been paid (e.g., the PBX network).

A solution to the aforementioned problems would be to assign to employees wireless telephony devices (e.g., wireless telephones or pagers) able to access the office telephone system as though they were conventional desktop telephones hardwired to the company's PBX. It is desirable to incorporate wireless devices into the PBX network so that users may place and receive telephone calls using the office PBX telephone system whether they are at their desks or at a remote location (e.g., away from their desks, out of the office, etc.). This would allow the enhanced conveniences of today's PBX networks (e.g., interoffice voice mail, direct extension dialing, etc.) to be available on wireless devices—a feature which is needed in today's society.

There have been recent attempts to incorporate wireless telephones into PBX networks. One system provided by Ericsson, requires the creation of a mini-cellular network within the confines of the enterprise. A cellular switching unit, unique wireless telephones and an auxiliary server are required to route inbound telephone calls to a wireless handset serving as a remote office telephone.

An in-building wireless system has been proposed by Nortel Networks. This system requires the wiring of picocells throughout the enterprise's building. The system routes inbound telephone calls to specialized wireless telephones serving as additional office PBX telephones. The wireless telephones cannot be used as conventional standard wireless telephones until they leave the premises.

These systems allow use of a wireless telephone as an office telephone, but they are not without their shortcomings. For example, each system requires specialized cellular equipment and wireless handsets. Moreover, the systems only use the wireless telephones for inbound telephone calls. In addition, these systems cannot use the wireless telephone as a conventional wireless telephone (i.e., not part of the enterprise's PBX network) within the building.

SUMMARY

A system for (and a method of) selectively establishing communication with one or more of a plurality of wireless devices serving as a virtual office telephone is provided. In a preferred embodiment, the system includes a wireless connect unit preferably serving as (or in conjunction with) an enterprise PBX. The wireless devices can be used (on-site or off-site) as standard PBX office telephones for both inbound and outbound telephone calls. Thus, features of the PBX network (e.g., voice mail, direct extension dialing, corporate calling plan, etc.) may be made available to the wireless device even though it is not physically connected to any enterprise telecommunications network (e.g., PBX). This system of virtual office telephones can be used to provide wireless devices the same level of service traditionally provided to hardwired telephones on a standard enterprise PBX network. In accordance with an embodiment of the invention, when the system receives an incoming call, it can route the call to a wireless device associated with a virtual office telephone, as well as to a combination of devices simultaneously, or as desired by the user. Outgoing calls can be placed from a wireless device associated with a virtual office telephone by dialing another extension telephone number (e.g., using the office PBX system) or by conventional dialing (e.g., using the PSTN).

DETAILED DESCRIPTION OF PREFERRED EMBODIMENTS

Preferred embodiments and applications of the invention will now be described. Other embodiments may be realized and structural or logical changes may be made to the disclosed embodiments without departing from the spirit or scope of the invention. Although the preferred embodiments disclosed herein have been particularly described as applied to a business or office environment, it should be readily apparent that the invention may be embodied for any use or application having the same or similar problems.

The invention is more fully understood with reference to the preferred embodiments depicted in FIGS. 1-6. An exemplary embodiment of the invention is discussed and illustrated with reference to its implementation within an office building or other enterprise establishment. In an office, for example, personnel are assigned to offices (or cubicles) with each office or person having an associated office telephone extension and an office telephone. The office telephone extensions are typically associated with a PBX, exchange, or other call processing infrastructure. The PBX allows each office, or at least each user, to be assigned a telephone extension and a direct inward dial (DID) telephone number. As known in the art, a telephone extension is typically a three or four digit telephone number where station-to-station (i.e., office-to-office) calls can be placed by dialing the three or four digit extension. This is commonly referred to as direct extension dialing. As also known in the art, a DID telephone number allows external calls (i.e., calls initiated outside of the office PBX) to be placed directly to the user or office telephone.

Figure 1:
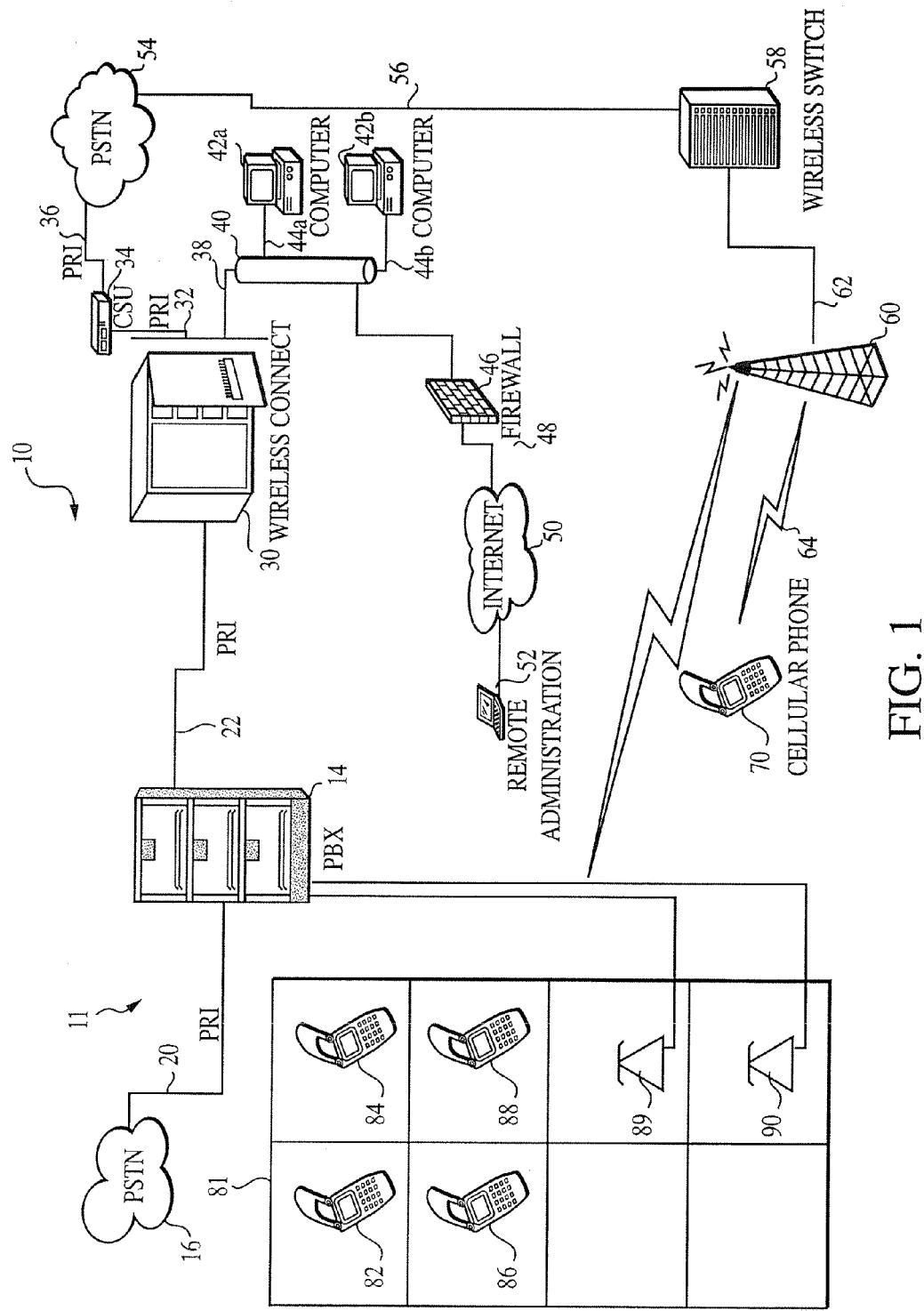
FIG. 1 illustrates an exemplary telecommunication system constructed in accordance with an embodiment of the invention.

In contrast to traditional enterprise communication networks, a preferred embodiment of the invention employs one or more wireless devices as virtual office telephones associated with one or more PBX extensions used in lieu of or in conjunction with standard hardwired desktop telephone sets (e.g., shown as standard telephone sets 89, 90). Referring to FIG. 1, wireless office telephones 82, 84, 86, 88 are not connected via hardwired lines to enterprise communication systems (e.g., PBX 14), but instead may be accessed using conventional wireless equipment through PSTN 16, 54 to a commercial wireless carrier symbolically represented by a wireless switch 58 and an antenna 60. Because the need for hardwired lines is eliminated for these virtual telephones, the considerable costs of constructing and maintaining a traditional hardwired telephone infrastructure at each enterprise location can be saved. For example, estimates of a large U.S. corporation are that traditional handsets or desktop telephones cost more than $100 per month per telephone due to the increasingly high costs of establishing and maintaining traditional hardwired telephone lines. For a large enterprise with personnel located in multiple geographic regions, the cost savings from eliminating traditional handsets or desktop telephones may be significant.

The invention is not to be limited to any particular environment. The invention may be implemented, for example, in a hotel, boarding house, dormitory, apartment, or other commercial or residential establishment, where individuals are assigned to a unique extension or DID telephone number. The term "office" as used herein encompasses a singular room or space within a business or other enterprise, or a hotel room or similar facility. The term "user" as used herein encompasses office personnel, hotel guests or other individuals associated with a telephone extension and DID telephone number.

FIG. 1 illustrates an exemplary telecommunication system 10 constructed in accordance with an embodiment of the invention. As will be discussed below, the system 10 provides for a full integration of communication devices, such as wireless office telephones 82, 84, 86, 88, wired office telephones 89, 90, and a personal wireless device 70, into an enterprise communication network. In doing so, the system 10 can selectively establish communications with one of a plurality of telephony devices associated with a particular telephone extension or DID telephone number. Moreover, the system 10 will allow communication devices such as wireless office telephones 82, 84, 86, 88 to perform as fully functional standard office telephones for both inbound and outbound communications. That is, wireless devices will be able to use features of the office network (e.g., direct extension dialing, corporate dialing plan, etc.) even though the devices are not directly connected to the office PBX or even within the confines of the office. The system also allows the wireless devices, including wireless office telephones 82, 84, 86, 88 and personal wireless device 70, to operate as independent wireless telephones capable of conventional interaction with a commercial wireless carrier if so desired. That is, the wireless devices 82, 84, 86, 88, 70 may receive calls placed to its (non-office) DID telephone number even though the system 10 also routes PBX calls to the wireless devices 82, 84, 86, 88, 70.

The system 10, as particularly illustrated herein, includes an office PBX network 11. The PBX network 11 may include a plurality of communication devices associated with PBX extensions at least logically connected by a conventional PBX 14. The PBX 14, which may be any commercially available one such as a Meridian 1 PBX produced by Nortel Networks, is connected to a calling network such as a public switched telephone network (PSTN) 16 by a primary rate interface (PRI) connection 20 or other suitable communication line or medium. The PBX extensions can be associated with wired or wireless telephones or other communication devices known in the art. As illustrated in FIG. 1, four wireless telephones 82, 84, 86, 88, and two standard wired telephones 89, 90 are each associated with different PBX extension, and are shown corresponding to six offices or users. For clarity purposes only, six telephones 82, 84, 86, 88, 89, and 90 are illustrated in FIG. 1, but it should be appreciated that any number or combination of telephones or other communication devices can be supported by the system 10. Moreover, although it is desirable to use wireless telephones in lieu of (or in conjunction with) standard hardwired desktop telephones, the invention is not to be limited to the particular type of device used in the system 10.

The PBX 14 is coupled to a wireless connect unit (WC) 30. The WC 30 is connected to the PBX 14 in this embodiment by a PRI connection 22 or other suitable communication medium. The WC 30 is also connected to a PSTN 54 by a PRI connection or other suitable digital communication medium. The illustrated PRI connection between the WC 30 and the PSTN 54 includes a first PRI connection 32, a channel service unit (CSU) 34, and a second PRI connection 36. As known in the art, a CSU is a mechanism for connecting a computer (or other device) to a digital medium that allows a customer to utilize their own equipment to retime and regenerate incoming signals. It should be appreciated that the illustrated connection between the WC 30 and the PSTN 54 is one of many suitable connections. Accordingly, the invention should not be limited to the illustrated connection. The WC 30 is one of the mechanisms that allows the integration of virtual office telephones into the PBX network 11 and its operation will be described below in more detail.

The WC 30 is preferably connected to a local area network (LAN) 40 by an appropriate communication medium 38. Although a LAN 40 is illustrated, it should be appreciated that any other network could be used. A plurality of computers (e.g., 42a, 42b) may be respectively connected to the LAN 40 by any appropriate communication lines 44a, 44b. The computers 42a, 42b can be used by network administrators or others to maintain WC 30 and other portions of the system 10. The LAN 40 may also be connected to the Internet 50 by a suitable communication medium 48. A firewall 46 may be used for security purposes. In a preferred embodiment, Internet 50 can be used to allow a remote administration device 52 (e.g., a personal computer) to perform remote administration of WC 30 by office personnel or other authorized users of the system 10. Remote administration will allow office personnel to set user preferences for particular telephone extensions. Thus, each telephone extension, particularly those associated with a virtual office telephone, is individually configurable.

PSTN 54 is connected in this embodiment to a commercial wireless carrier by the wireless switch 58 or other wireless carrier equipment by an appropriate communication medium 56. The wireless switch 58 is connected to at least one antenna 60 (by an appropriate communication medium 62) for transmitting signals 64 to wireless devices, such as wireless office telephones 82, 84, 86, 88 or personal wireless device 70. The wireless device could also be a pager, personal digital assistant (PDA), landline telephone, facsimile machine or other wired/wireless communication device. It may desirable for the wireless device to be capable of handling both (or either) digital and analog communication signals. It should be noted that any type of wireless communication protocol (or a combination of different protocols), such as TDMA, CDMA, GSM, AMPS, MSR, iDEN, WAP, etc., could be used.

It should be appreciated that the WC 30 is connected to a wireless carrier through a PSTN 54 and not by unique hardware or an in-office cellular network. As a result, WC 30 only has to interface with conventional components, such as the PBX 14 and PSTN 54. Thus, the system is substantially technology independent. Moreover, special wireless devices are not required, which allows the wireless devices to function in a conventional manner (e.g., as independent wireless telephones) and as part of the PBX network 11 (if so desired) as if they were hardwired office telephones.

Figure 2:
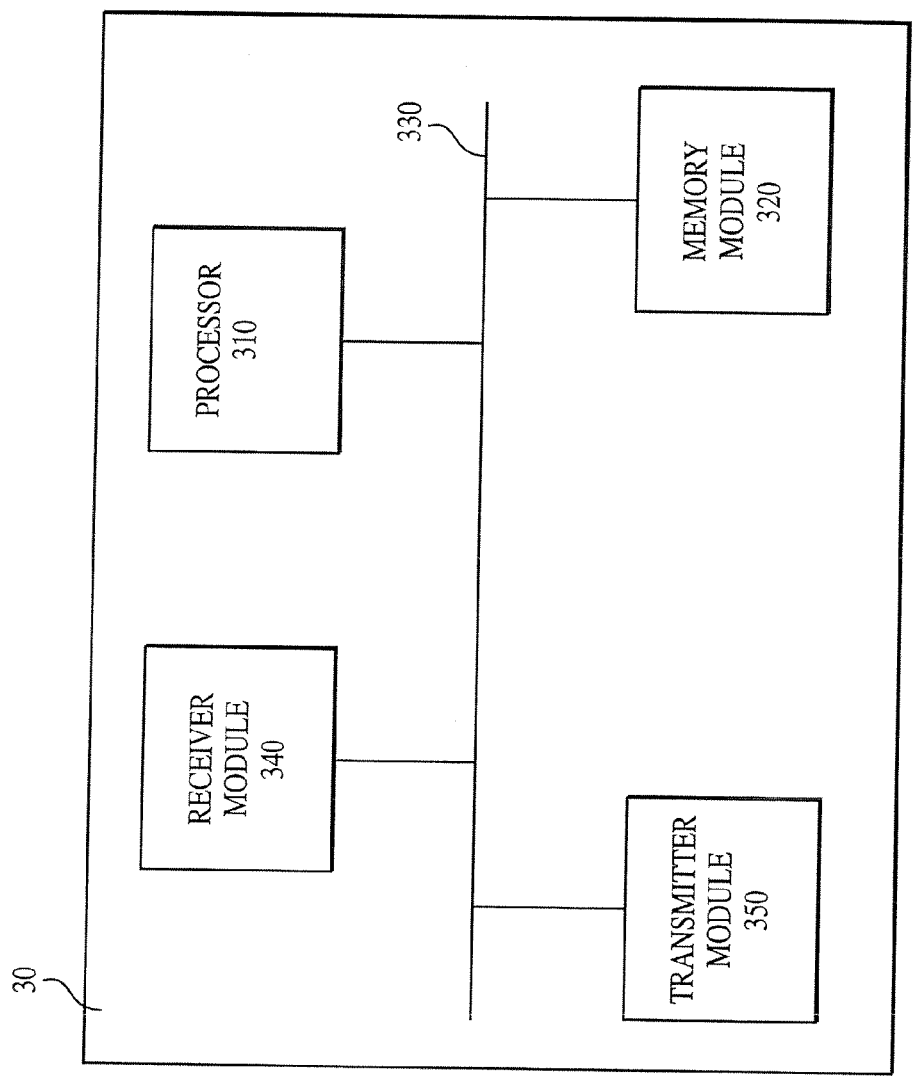
FIG. 2. illustrates a wireless connect unit in accordance with an embodiment of the invention.

As noted above, the WC 30 allows for the full integration of wireless devices into the PBX network 11 in lieu of (or in conjunction with) standard hardwired telephones. In a preferred embodiment, WC 30 is a processor-based stand-alone unit capable of handling communications directed to the PBX network 11. In a preferred embodiment, WC 30 is composed of one or more processors generically represented by processor module 310 executing one or more computer programs stored in one or more memory units generically represented by memory module 320, which is coupled to processor module 310 via bus 330, as shown in FIG. 2. Memory module 320 also contains one or more databases and other processing memory used during the overall operation of system 10, as will be described below. Receiving and transmitting modules 340, 350, respectively, which are coupled to processor module 310 and memory module 320 via bus 330, are employed to receive and transmit information to the PBX and PSTN during call processing, as well as receiving and transmitting other information such as administrative information.

The modules (310, 320, 330, 340, 350) making up WC 30 may be implemented using any known hardware or software devices. For example, in one embodiment, workload performed by receiving and transmitting modules 340, 350, as well as some of the processing functions of processor module 310 of WC 30 are implemented using one or more conventional processor-based programmable telephony interface circuit cards used to interface WC 30 with PBX 14 and the PSTN. They are programmed to perform the conventional telephony services required to place and receive calls, as well as programmed to perform the unique call processing functions described below. The WC 30 preferably contains a database of extension numbers (also referred to herein as PBX extensions) and DID telephone numbers associated with each existing PBX extension. The database will be stored on a computer readable storage medium, which may be part of (e.g., in memory module 320) or connected to the WC 30. The database may also contain a wireless connect/PBX extension (hereinafter referred to as a "WC-PBX extension") and one or more wireless device telephone numbers associated with each PBX extension. In this embodiment, software running on the telephony cards interfaces with the database to perform the various call processing functions discussed below.

In this embodiment, the PBX 14 contains a coordinated dialing plan (CDP) steering table. The CDP steering table will be stored and retrieved from a computer readable storage medium, which may be part of or connected to the PBX 14. The CDP steering table directs the routing of PBX extensions to the WC 30 over the PRI 22 between the WC 30 and the PBX 14. In addition, the CDP steering table of the PBX 14 directs the routing of WC-PBX extensions received from the WC 30 to the appropriate office extensions and associated office (or virtual office) telephones.

Figure 3:
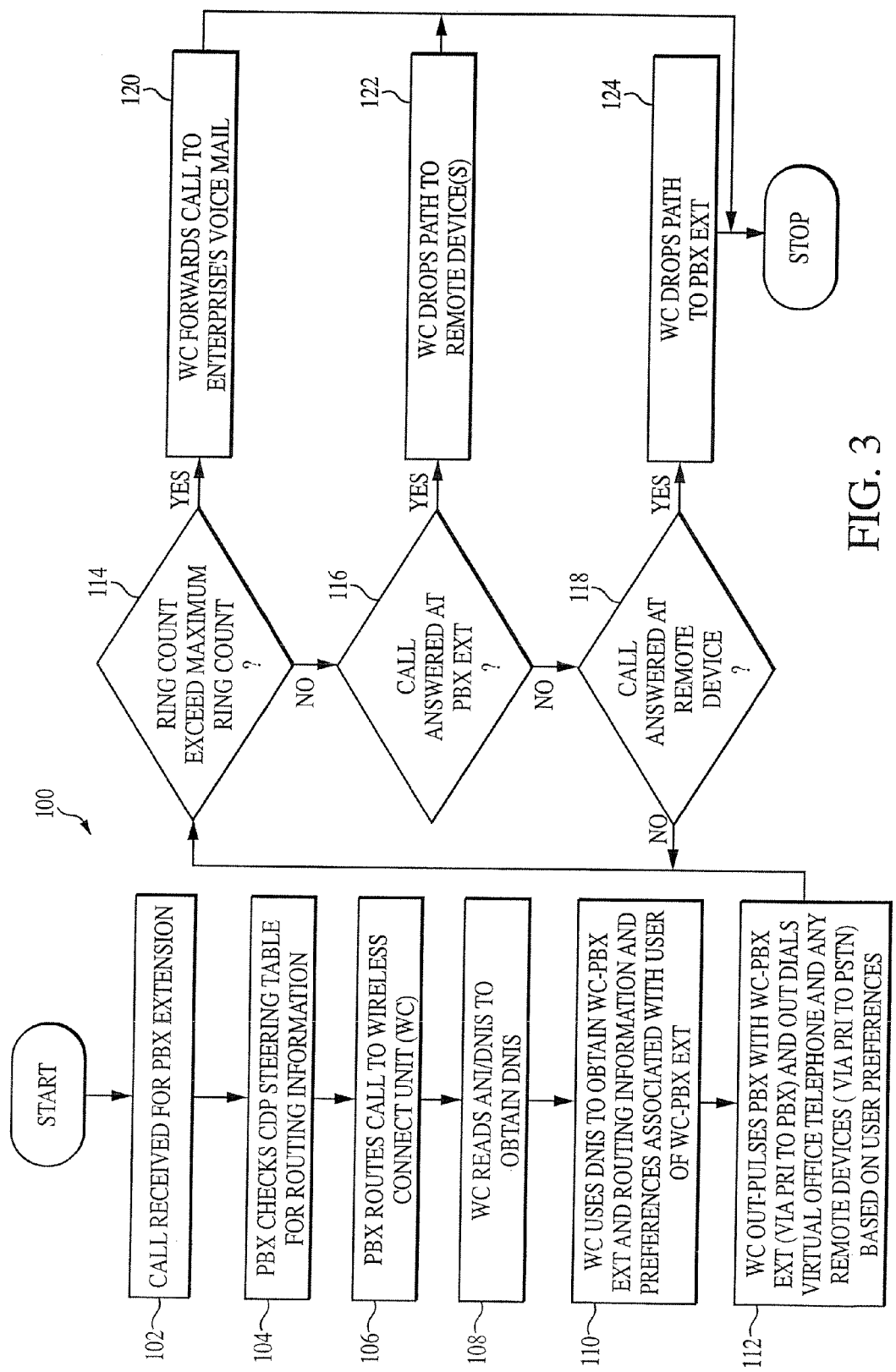
FIG. 3 illustrates in flowchart form exemplary inbound station-to-station call processing performed in accordance with an embodiment of the invention.
Figure 4:
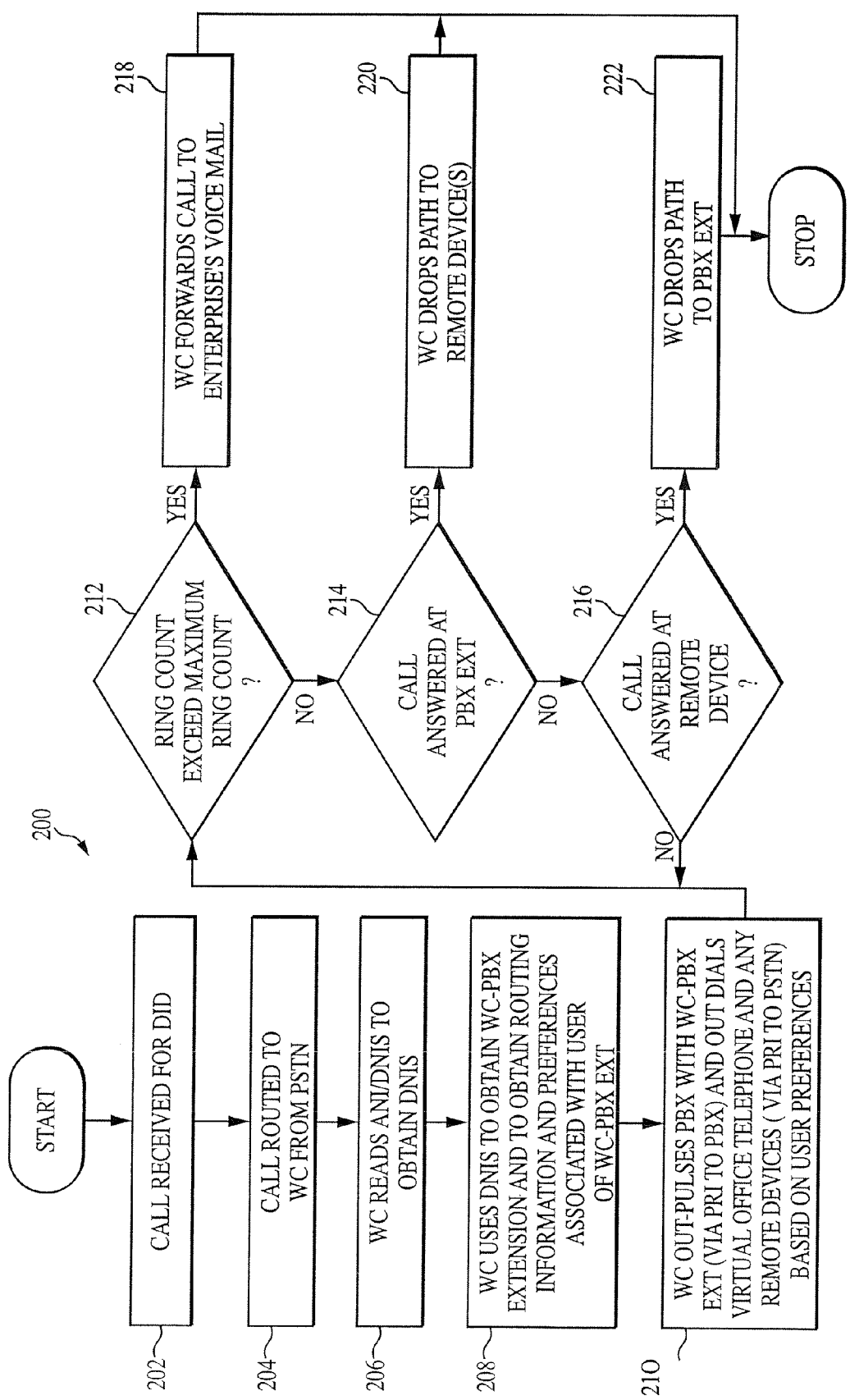
FIG. 4 illustrates in flowchart form exemplary inbound direct inward dialing (DID) call processing performed in accordance with an embodiment of the invention.
Figure 5:
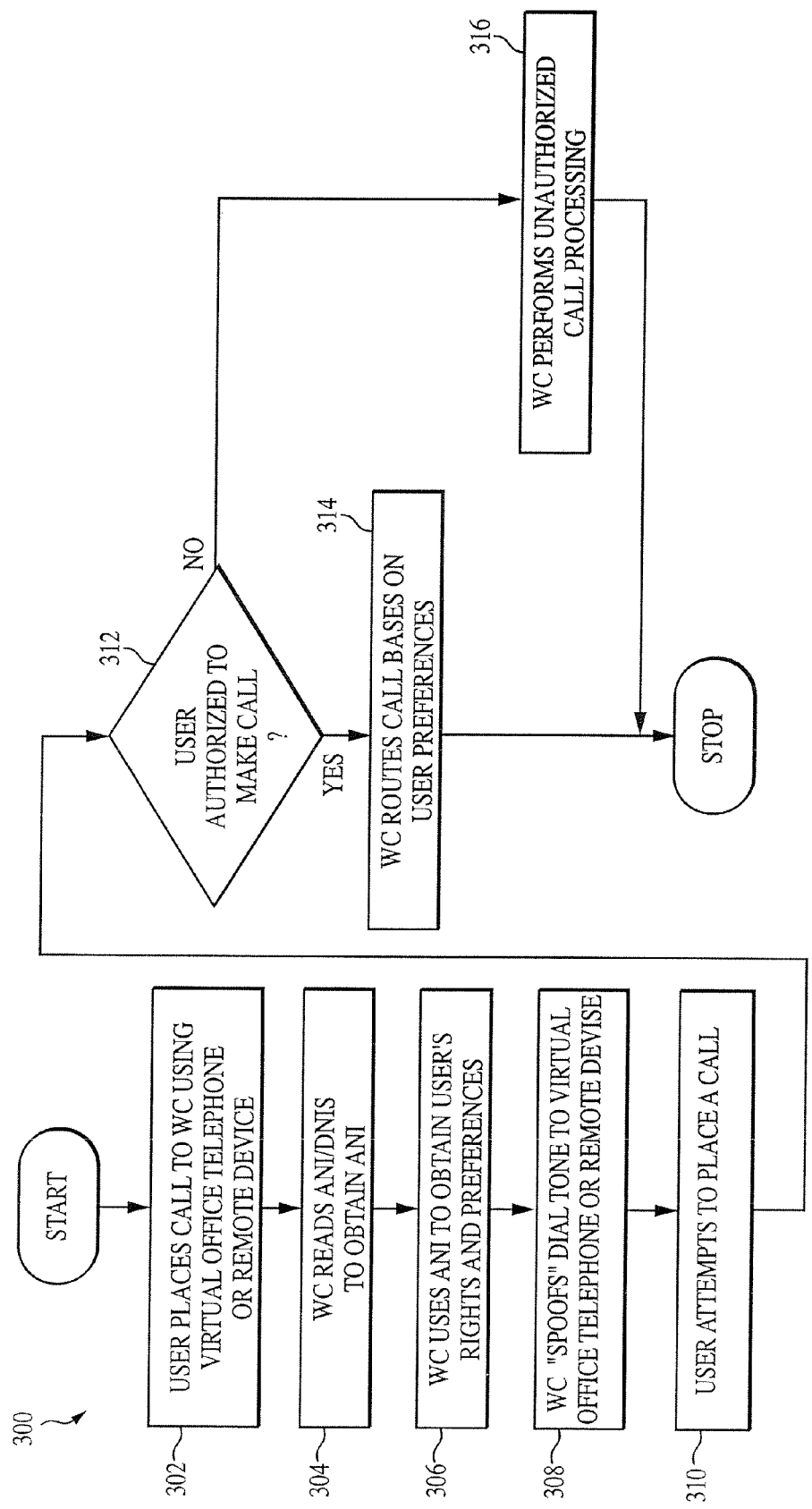
FIG. 5 illustrates in flowchart form exemplary remote outbound call processing performed in accordance with an embodiment of the invention.

In accordance with a preferred embodiment of the invention, processor module 310 executes one or more programs stored in memory module 320 to process calls received through PBX 14 or PSTN. FIGS. 3-5 illustrate some of the basic call processing events which WC 30 may be programmed to handle in accordance with exemplary embodiments of the invention. As illustrated in FIG. 3, when an incoming station-to-station call (i.e., a direct extension call from one PBX telephone device to another PBX device) is received by the PBX 14 for an existing PBX extension (step 102), the PBX 14 looks up the PBX extension in the CDP steering table (step 104) to determine where the call should be routed. Based on the CDP steering table the call to the PBX extension is routed to the WC 30 (step 106).

As is known in the art, the incoming call will have automatic number identification (ANI) and dialed number identification service (DNIS) information. The ANI identifies the telephone number of the calling party and is traditionally used for "caller ID." DNIS identifies the telephone number of the called party. The WC 30 reads the ANI/DNIS information from the incoming call to obtain the DNIS information (step 108). As noted above, the WC 30 has assigned a new WC-PBX extension to each existing PBX extension. The WC-PBX extension, routing information, and user preferences are obtained by using the DNIS information (identifying the PBX extension) as an index into the WC 30 database (step 110). Routing information will include any additional remote telephone numbers, voice mail box numbers, or other identification numbers of communication devices associated with the PBX extension.

At step 112, the WC 30 out-pulses the WC-PBX extension obtained in step 110 for any associated hardwired office telephone (e.g., 89, 90, etc.). Where the associated office telephone is a virtual office telephone (e.g., telephone 82), however, the call is routed through the PSTN 16, 54 and the commercial wireless carrier network servicing the associated wireless device. In response, the commercial wireless carrier relays its signal through its network (e.g., through the antenna 60) in a conventional manner in an attempt to reach the user or wireless telephone associated with the PBX extension dialed. In accordance with a preferred embodiment, at the same time (if desired), the WC 30 attempts to contact one or more alternative communication devices (e.g., out-dialing a remote telephone number via the PRI connection between the WC 30 and the PSTN 54). In such an embodiment, the station-to-station call is thus routed to both the virtual office telephone and also to at least one remote device simultaneously or substantially simultaneously (or as determined by the user preferences). It should be noted that the illustrated processing 100 is just one example of how an incoming station-to-station call may be handled. Individual user preferences may alter the way the call is processed. It should be noted that in a preferred embodiment, the WC 30 is out-pulsing the WC-PBX extension (for hardwired telephones), dialing the virtual office telephone number, and contacting one or more remote communication devices. This gives the WC 30 control over the connections to the office telephones and any remote devices.

At step 114, it is determined if the current ring count (i.e., number of rings) exceeds the maximum ring count defined by the user. Since the WC 30 is controlling the call at this time it can track the number of rings. If the ring count exceeds the maximum ring count, then the WC 30 (if desired) forwards the call to the enterprise's voice mail (step 120). If the ring count does not exceed the maximum ring count, the WC 30 determines if the call is answered at the (virtual or standard) office telephone associated with the PBX extension dialed (step 116). The PBX 14 will issue an off-hook message to the WC 30 if the appropriate standard office telephone is answered. If it is determined that the call is answered at the (virtual or standard) office telephone, the WC 30 drops the call's path to any other remote devices (e.g., personal wireless device 70) via the PSTN 54 and maintains the path to the office telephone (step 122).

In a preferred embodiment, it may be desired that the call to the virtual office telephone or any remote devices be actually answered by a user and not by a service in conjunction with the user's wireless carrier. In known systems, wireless carriers often answer a call if there is a bad connection, the wireless channels are overloaded, or for other reasons (such as initiating a wireless carrier's answering service). When the wireless carrier answers the call in these situations, the call would appear to WC 30 as an "answered call" even if the user did not actually answer the call.

One way to distinguish a user answered call from a wireless service answered call is to prompt the user to transmit an acknowledgement signal such as a dual tone multi-frequency (DTMF) tone to the WC 30 via the keypad of the wireless device. Upon detecting the answered call, WC 30 can send a voice message instructing the user to "press the # button to complete the call." If the DTMF tone is not received, then the WC 30 presumes that the call was answered by the wireless carrier, or that the user does not want to answer the call which the WC 30 treats as an unanswered call. If at step 118, for example, it is determined that the remote device (e.g., personal wireless device 70) was answered by the user, the WC 30 drops the WC-PBX extension path and initiates the connection between the calling party and the remote device (step 124). If the call is not answered at the remote device in step 118, process flow returns to step 114 to check whether the ring count has exceeded the maximum ring count.

In accordance with a preferred embodiment of the invention, the database of WC 30 may also contain numerous system-defined user access rights and user modifiable preferences, which can alter the call processing of the invention. An office administrator may use the network computers 42a, 42b or a remote administration device 52 to set user access rights and priorities (example discussed below with respect to outbound call processing 300 illustrated in FIG. 5). The user may use the remote administration device 52 to set numerous user preferences. It is desirable that a Web-based or graphical user interface be used so that the user can easily access and set user preferences. The network computers 42a, 42b (or remote device 52) may also be used by the user if so desired.

User preferences may include how the user associated with a particular PBX extension wants incoming calls to be routed. For example, the user can request that incoming calls be routed to the (virtual or standard) office telephone and one or more remote devices simultaneously. The user instead can request that an incoming call be routed to the office telephone first, then after a user-defined number of rings, the remote device(s) and eventually sent to the PBX voice mail. Alternatively, the user can request that an incoming call be routed to one or more remote devices first, then the office telephone, and subsequently to the PBX voice mail. The user can request that all incoming calls be routed directly to the PBX voice mail. The user can request that a menu of options be played to the caller so that the caller can decide how to complete the call. The user can set separate ring counts for the office telephone and remote devices. The user can set dial tone options, which allows the user to control how long a dial tone is played before a dial tone time-out occurs. The user can adjust the time between dials. These are just a few of the user preferences that can be stored and used by the WC 30, which can alter incoming and out going call processing. If the user does not change the user preferences, or only changes a few preferences, system defaults are used.

When receiving an inbound DID call, call processing flow 200 (as illustrated in FIG. 4) is performed in accordance with an embodiment of the invention. At step 202, a DID telephone call is dialed by an external telephone device and received by system 10 through the PSTN. In a preferred embodiment, the PSTN has been programmed in advance to route all DID telephone numbers used by the system 10 to the WC 30. In addition, the PSTN has also been programmed to route calls incoming to the DID telephone number directly to the PBX 14 if the path to the WC 30 has failed. That is, the embodiment incorporates a failure path into the system 10 to ensure that a failure of the WC 30 or the PRI connection between the WC 30 and the PSTN does not interrupt the operation of the office PBX network 11. This is possible since the steering table of the office PBX 14 contains the DID telephone numbers. The PBX 14 has the capability to resolve these DID numbers. Thus, the PBX 14 can be used if needed to handle DID telephone calls. For purposes of this discussion, it is presumed that the WC 30 and the connection between the WC 30 and the PSTN 54 are fully operational. Thus, at step 204, the PSTN routes the DID call to the WC 30.

The WC 30 reads the ANI/DNIS information from the incoming DID call to obtain the DNIS information (step 206). The WC 30 resolves the call by determining what WC-PBX extension is associated with the telephone number identified by the DNIS. The WC-PBX extension, routing information and user preferences are obtained by the WC 30 (step 208). At step 210, the WC 30 out-pulses the PBX 14 through the PRI connection 22 between the WC 30 and PBX 14 with the obtained WC-PBX extension for any hardwired office telephones (e.g., 89, 90). For any virtual office telephones associated with the WC-PBX extension, WC 30 out dials the commercial wireless carrier servicing the associated virtual office telephone in the same manner described above. In accordance with an embodiment of the invention, at the same time (if desired), the WC 30 attempts to contact one or more remote devices (e.g., by out-dialing one or more user designated remote telephone numbers via the PRI connections between the WC 30 and the PSTN 54). Therefore, the inbound DID telephone call may be routed to the (virtual or standard) office telephone and one or more remote devices (e.g., personal wireless device 70) simultaneously (or as determined by the user preferences). It should be noted that the illustrated processing 200 is just one example of how an incoming DID call may be handled.

At step 212, it is determined whether the current ring count exceeds the maximum ring count defined by the user. If the ring count exceeds the maximum ring count, then the WC 30 forwards the call to the enterprise's voice mail (step 218). If the ring count does not exceed the maximum ring count, the WC 30 determines whether the call is answered at the PBX extension (step 214). If it is determined that the call is answered at the PBX extension, the WC 30 drops the call's path to the remote device via the PSTN and maintains the path to the PBX extension (i.e., virtual or standard office telephone) (step 220). If at step 214 it is determined that the call is not answered at the PBX extension, the WC 30 determines if the call is answered at the remote device (e.g., 70) (step 216). In a preferred embodiment, it may be desired that calls to virtual office telephones 82, 84, 86, 88 or remote devices are actually answered by the user and not by a service of the wireless carrier. Therefore, to distinguish a user answered call from a wireless service answered call, the WC 30 may require an acknowledgment signal as in the previous embodiment described above. If at step 216 it is determined that the call was answered by the user using a remote device, the WC 30 drops the path to the PBX extension and maintains the connection to the answering remote device (step 222). (As an alternative, control and responsibility for the remainder of the call can be left with the PSTN in order to free up PRI channels between WC 30 and PSTN 54.) If the call is not answered by any remote device in step 216, process returns to step 212 to check whether the ring count has exceeded the maximum ring count.

Initially, the call processing reduces the processing load on the PBX 14, since the WC 30 (and not PBX 14) is resolving the DID telephone numbers. This allows the PBX 14 to handle call processing for more extensions if desired. Additionally, since the WC 30 is resolving the DID calls, the WC 30 can out pulse the PBX 14 and out dial the PSTN 54 simultaneously (if desired) without waiting for the PBX 14 to process/resolve the call. Moreover, as noted above, redundancy is provided by allowing the PBX network 11 to function as a standard PBX if the WC 30 or the link between the WC 30 and the PSTN 54 fails.

In accordance with a preferred embodiment, WC 30 allows virtual office telephones (e.g., wireless telephones 82, 84, 86, 88) or any remote device (e.g., remote device 70) to act as standard office PBX telephones for outbound telephone calls following call processing flow 300 illustrated in FIG. 5. That is, a user will be able to use his virtual office telephone (or any remote device) to make station-to-station calls as if he were using a hardwired standard office telephone directly connected to the office PBX 14. From the virtual office telephone or remote device, the user will also be able to perform other PBX functions as well. At step 302, a user places a call to the WC 30 from the device 82, 84, 86, 88, 70. One way the user may do this would be to define a speed dial key (or sequence of keys) on the device handset. When the user activates the appropriate speed dial key/keys, the device 82, 84, 86, 88, 70 dials into the WC 30. Another way to dial into the WC 30 would be by fixed dialing. Fixed dialing is a feature provided by the wireless carrier to always connect the wireless telephone to a particular number or service, and, in this case, it would connect the user to the WC 30. Any number of other methods may be used to dial into the WC 30.

At step 304, the WC 30 reads the ANI/DNIS information received from the device 82, 84, 86, 88, 70 to obtain the ANI information. The ANI identifies the telephone number of the calling device. The WC 30 uses the ANI information to obtain the user's access rights and user preferences (step 306). As noted above, a user is provided with the ability to set various user preferences. The enterprise also has the ability to set access rights defining what type of calls the user can place from the remote device (e.g., local, long distance, international, station-to-station, etc.). For example, if using PRI connections between the PSTN 54 and the WC 30, the PBX 14 and the WC 30, and the PBX 14 and the PSTN 16, users can be assigned into particular access groups by assigning each user to a particular channel or group of channels of the PRI. The user assignments can be stored in a database memory within memory module 320 of WC 30 for access during a validation or authentication process performed by processor module 310. In the alternative, the responsibility over the user assignments can be incorporated into PBX 14 or some other (on-site/remote) equipment.

As is known in the art, in North America and Japan, for example, each PRI contains 23 "B" channels that can be used for voice communications. Each B channel can be programmed with different calling capabilities by the PBX 14. That is, some channels can be programmed for all types of calls (e.g., international, long distance, local etc.), others for long distance and local calls, while others can be programmed solely for local or internal station-to-station calls. The channels can also be restricted to a limited number of authorized telephone numbers as well. The programming can be determined by the enterprise. Since the channels can be programmed with different calling capabilities, the enterprise can implement different access groups, with each group defining a user's device access.

This feature significantly limits the enterprise's device (e.g., wireless service) costs because user access to services can be substantially restricted. For example, the enterprise may want delivery personnel to have a wireless telephone for internal dialing purposes, but may be afraid of misuse by the personnel. Implementing the above embodiment, the enterprise can group all wireless telephones assigned to its delivery personnel to a channel(s) restricted solely to internal calls. Any grouping is possible. Priorities may also be assigned. A user assigned to group 1 (programmed for all calling capabilities) may be given priority to bump a user assigned to group 2 (having less calling capabilities) in the event that the channels assigned to group 1 are busy. Any grouping or priority scheme can be implemented by the enterprise and is application specific.

At step 308, the WC 30 "spoofs" a dial tone to the virtual office telephone 82, 84, 86, 88 and remote device 70. That is, the WC 30 generates and transmits a dial tone as if the user had picked up a conventional office telephone hardwired to the PBX 14. In a preferred embodiment, the spoofing of the dial tone is achieved by the WC internally generating the appropriate tone (e.g., through software or hardware modules). The dial tone is then played to the virtual office telephone 82, 84, 86, 88 or remote device 70 as a prompt while waiting to receive DTMF digits from the user indicating the telephone number the user wishes to dial. At this point in the call process flow 300, the user is connected to the office PBX and may access any of its standard features. For purposes of this illustrated embodiment, it is presumed that the user wishes to place an outbound call at this time. At step 310, the user attempts to place a call and the WC 30 receives the number dialed by the user. At step 312, the WC 30 determines if the user is authorized to make the call. For example, the WC 30 checks the user's access rights, and if the user is authorized to place the call, the call is routed to the correct channel by the WC 30 based on user preferences, access rights and the channel definitions (step 314). If the user is not authorized to place the call (i.e., the call exceeds the user's access rights), the WC 30 performs unauthorized call processing (step 316). Unauthorized call processing may include playing a message to the user stating that the user does not have authority to place the call, disconnecting the call, or any other action desired by the enterprise.

If the user decides to place a station-to-station call, for example, the call would appear to be an internally dialed call at the destination office telephone. For example, if the PBX 14 uses a different ring for internal calls, then the internal ring would be sent to the destination telephone even if the call was made from a virtual office telephone 82, 84, 86, 88 or remote device 70. If the PBX 14 normally displays the PBX extension of the calling party on the called office phone, then the PBX extension of the calling party would be displayed on the called office telephone even though the call was initiated from a virtual office telephone 82, 84, 86, 88 or remote device 70.

Many enterprises have already provided wireless communication devices to their personnel. These wireless devices already have existing telephone numbers and are external to the enterprise PBX. Since the devices are already in use by personnel and their clients, the enterprise may not want to change their telephone numbers. There is a need to integrate these telephone numbers into the enterprise PBX. One way to integrate these telephone numbers would be to forward their unanswered calls to the PBX voice mail. This can be accomplished in accordance with an embodiment of the invention whether the wireless device is associated with a PBX extension or not.

For example, the enterprise can purchase additional DID telephone numbers from the telephone company (if necessary). These additional DID telephone numbers are stored in the database of the WC 30 together with special routing instructions to route all calls directly to a user's PBX voice mail box (or other destination as desired). The user of a wireless telephone can program the wireless telephone to forward unanswered calls to his associated DID telephone number. Alternatively, the user can have the wireless carrier forward unanswered calls to the DID telephone number as well. This way, any unanswered call to the wireless telephone will be forwarded to the WC 30, which resolves the DID and forwards the call to the appropriate PBX voice mail box. Using this feature, the likelihood is increased that the user will retrieve his messages since he can retrieve all of his messages through the PBX voice mail. This also alleviates the need for the user to have a separate voice mail service from the wireless carrier, which may reduce the cost of the wireless service.

The invention can be embodied in any number of different applications. One embodiment, for example, applies the invention to a hotel having a large number of rooms without routing telephone lines or other wiring to each room. Many if not all rooms would have a telephone extension that is associated with the enterprise PBX, as well as a wireless telephone associated with the PBX extension (integrated using an embodiment of the invention). In addition, one or more rooms could employ more than one PBX extension if desired by hotel guests. If, for example, a guest of the hotel were using a standard room telephone and associated PBX extension for network access by his personal computer, he could still make and receive calls through a virtual room telephone using a wireless telephone or other device in a manner transparent to the calling party. This embodiment allows an enterprise to multiply the number of its telephone lines without incurring the expense of conventional wiring previously required to install additional lines for the hotel rooms.

In a preferred embodiment, WC 30 is co-located with the enterprises' PBX 14, but may also be centrally located in a remote location or distributed among the many locations, or any combination of these arrangements.

Figure 6:
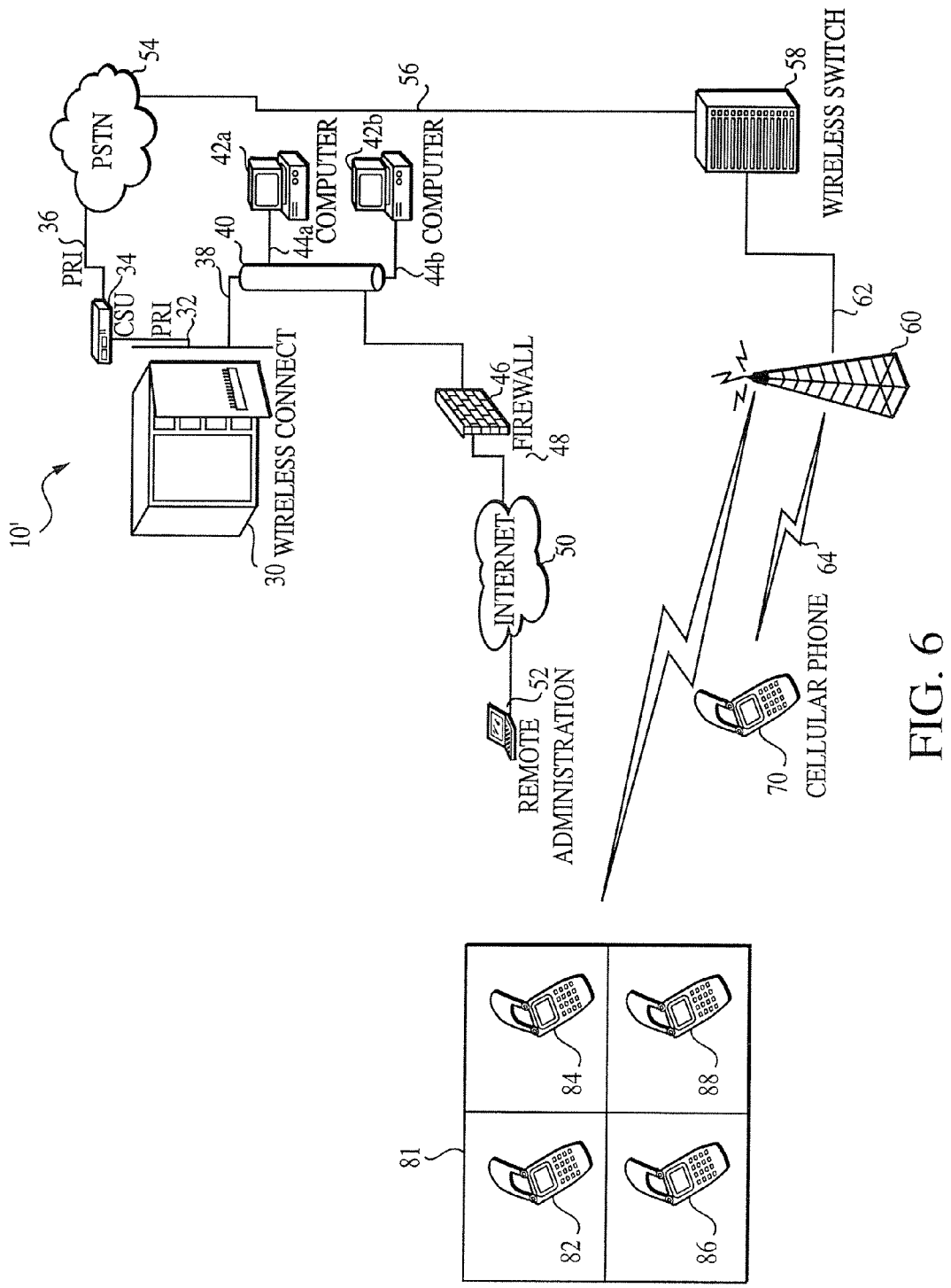
FIG. 6 illustrates another exemplary telecommunication system constructed in accordance with an embodiment of the invention.

While the preferred embodiments have been described thus far with reference to a PBX network 11 and hardwired standard office telephones, this structure is not required and a system of virtual office telephones may be implemented using only the wireless connect WC 30, as shown in FIG. 6. In this embodiment, the system 10' of virtual office telephones could provide a central location for receiving calls to an enterprise and placing calls from an enterprise, while affording system users the flexibility of wireless office telephones. Referring to FIG. 6, all features of the exemplary telecommunication system 10 illustrated in FIG. 1 are included with the exception of PBX network 11 including conventional PBX 14, PRIs 20, 22 and PSTN 16. Instead, the WC 30 directs all calls to and from the wireless office telephones to the PSTN 54 through the CSU 34 and PRIs 32, 36 for routing to wireless office devices 82, 84, 86, 88 or personal wireless device 70 using conventional wireless equipment as described with reference to FIG. 1. Although the traditional features of a conventional PBX, such as PBX voice mail, user access rights, multiple-location routing and channel definitions, have been removed in this embodiment, many of these features may be available from WC 30 or the wireless carrier for the wireless devices 82, 84, 86, 88, 70. Compared to the cost of a traditional PBX system, for smaller enterprises, obtaining these features from the wireless carrier may be a more cost effective option.

While preferred embodiments have been specifically described and illustrated herein, it should be apparent that many modifications to the embodiments and implementations of the invention can be made without departing from the spirit or scope of the invention. For example, while the preferred embodiments illustrated herein have been limited to the processing of voice (packet or circuit switched) calls, it should be readily apparent that any form of call (e.g., audio, video, data) may be processed through WC 30 to any communication device (e.g., cellular phone, pager, office/residential landline telephone, computer terminal, personal digital assistant (PDA), etc.). The individual method steps of the exemplary operational flows illustrated in FIGS. 3-5 may be interchanged in order, combined, replaced or even added to without departing from the scope of the invention. Any number of different operations not illustrated herein may be performed utilizing the invention.

In addition, while the illustrated embodiments have demonstrated implementations of the invention using PBX-based communication systems, it should be readily apparent that the WC module may be connected (directly or indirectly) with any other network switching device or communication system used to process calls such as a central switching office, Centrex system, or Internet server for telephone calls made over the public switched telephone network, private telephone networks, or even Internet Protocol (IP) telephony networks made over the Internet.

It should be apparent that, while only PRI lines (e.g., between PBX 14 and WC 30, between PBX 14 and PSTN 16) have been illustrated in discussing preferred embodiments of the invention, these communication lines (as well as any other communication lines or media discussed herein) may be of any form, format, or medium (e.g., PRI, T1, OC3, electrical, optical, wired, wireless, digital, analog, etc.). Moreover, although PSTN 16, 54 are depicted as separate networks for illustration purposes, it should be readily apparent that a single PSTN network alone may be used in reducing the invention to practice. The use of a commercial wireless carrier network (represented by the wireless switch 58 and the antenna 60) as described herein may be implemented using one or more commercial carriers using the same or different signaling protocols (e.g., Sprint PCS and Nextel, etc.) depending on the communication devices registered with the system.

The modules described herein such as the modules making up WC 30, as well as WC 30 and PBX 14 themselves, may be one or more hardware, software, or hybrid components residing in (or distributed among) one or more local or remote systems. It should be readily apparent that the modules may be combined (e.g., WC 30 and PBX 14) or further separated into a variety of different components, sharing different resources (including processing units, memory, clock devices, software routines, etc.) as required for the particular implementation of the embodiments disclosed herein. Indeed, even a single general purpose computer executing a computer program stored on a recording medium to produce the functionality and any other memory devices referred to herein may be utilized to implement the illustrated embodiments. User interface devices utilized by in or in conjunction with WC 30 may be any device used to input and/or output information. The interface devices may be implemented as a graphical user interface (GUI) containing a display or the like, or may be a link to other user input/output devices known in the art.

Furthermore, memory units employed by the system may be any one or more of the known storage devices (e.g., Random Access Memory (RAM), Read Only Memory (ROM), hard disk drive (HDD), floppy drive, zip drive, compact disk-ROM, DVD, bubble memory, etc.), and may also be one or more memory devices embedded within a CPU, or shared with one or more of the other components. Accordingly, the invention is not to be seen as limited by the foregoing description, but is only limited by the scope of the appended claims.

What is claimed as new and desired to be protected by Letters Patent of the United States is:

1. A method of providing access to an enterprise telecommunication network to a wireless telephone for an outgoing telephone call, said method comprises:
    receiving a first telephone call from the wireless telephone;
    identifying a wireless telephone number of the wireless telephone;
    using the wireless telephone number to retrieve an enterprise telephone extension associated with the enterprise telecommunication network;
    retrieving at least one user preference and at least one enterprise preference associated with the retrieved enterprise telephone extension;
    generating a simulated dial tone;
    sending the simulated dial tone to the wireless telephone in response to the first telephone call from the wireless telephone to indicate the wireless telephone's connection to the enterprise telecommunication network; and
    providing the wireless telephone with telecommunication access to the enterprise telecommunication network for an second telephone call based on the retrieved at least one user preference and the retrieved at least one enterprise preference.

2. The method of claim 1, wherein the at least one enterprise preference comprises an access group defining authorized outbound call access rights for a user of the wireless telephone.

3. The method of claim 1, further comprising the act of allowing the wireless telephone to place a call using the services of the enterprise telecommunication network to another extension of the enterprise telecommunication network.

4. The method of claim 1, wherein said at least one user preference comprises a dial tone timeout period, wherein a user of the wireless telephone is prevented from placing a call through the enterprise network after the dial tone timeout period expires.

5. The method of claim 1, further comprising the act of allowing the wireless telephone to place a call using the services of the enterprise telecommunication network to a telephony device not associated with the enterprise telecommunication network.

6. A telecommunication device comprising:
    a storage medium for storing at least one user preference and at least one enterprise preference associated with each extension of an enterprise telecommunication network; and
    a telephony interface coupled to the storage medium and the enterprise telecommunication network, said telephony interface being adapted to:
    receive a first telephone call from a wireless telephone,
    identify a wireless telephone number of the wireless telephone,
    use the wireless telephone number to retrieve a first enterprise extension telephone number associated with an extension of the enterprise telecommunication network and with the wireless telephone,
    retrieve the at least one user preference and enterprise preference associated with the retrieved first enterprise extension telephone number from the storage medium,
    determine whether the wireless telephone can be provided access to services of the enterprise telecommunication network,
    and if it is determined that the wireless telephone can be provided access to services of the enterprise telecommunication network, the interface is further adapted to generate and send a simulated dial tone to the wireless telephone in response to the first telephone call from the wireless telephone to indicate the wireless telephone's connection to the enterprise telecommunication network to and thereby alert the wireless telephone that access to the enterprise telecommunication network has been granted for a second telephone call.

7. The device of claim 6, wherein if it is determined that the wireless telephone cannot be provided access to the services of the enterprise telecommunication network, the interface is further adapted to perform unauthorized call processing.

8. The device of claim 6, wherein if it is determined that the wireless telephone cannot be provided access to the services of the enterprise telecommunication network, the interface is further adapted to play a message to the wireless telephone indicating that the wireless telephone cannot be provided access to the services of the enterprise telecommunication network.

9. The device of claim 6, wherein if it is determined that the wireless telephone cannot be provided access to services of the enterprise telecommunication network, the interface is further adapted to disconnect the call from the wireless telephone.

10. The device of claim 6, wherein said at least one enterprise preference comprises an access group defining authorized outbound call access of a user of the wireless telephone.

11. The device of claim 6, wherein the interface is further adapted to allow the wireless telephone to place a call using the services of the enterprise telecommunication network to another extension of the enterprise telecommunication network.

12. The device of claim 6, wherein the interface is further adapted to allow the wireless telephone to place a call using the services of the enterprise telecommunication network to a telephony device not associated with the enterprise telecommunication network.

* * * * *